United States Patent
Kim et al.

(10) Patent No.: US 11,742,513 B2
(45) Date of Patent: Aug. 29, 2023

(54) SEPARATOR FOR LITHIUM-SULFUR BATTERIES AND LITHIUM-SULFUR BATTERY COMPRISING THE SAME

(71) Applicant: LG CHEM, LTD., Seoul (KR)

(72) Inventors: Sunjin Kim, Daejeon (KR); Dongseok Shin, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 325 days.

(21) Appl. No.: 16/646,059

(22) PCT Filed: Oct. 23, 2018

(86) PCT No.: PCT/KR2018/012571
§ 371 (c)(1),
(2) Date: Mar. 10, 2020

(87) PCT Pub. No.: WO2019/083257
PCT Pub. Date: May 2, 2019

(65) Prior Publication Data
US 2020/0280038 A1  Sep. 3, 2020

(30) Foreign Application Priority Data
Oct. 25, 2017  (KR) ........................ 10-2017-0138965

(51) Int. Cl.
*H01M 50/457* (2021.01)
*H01M 10/052* (2010.01)
(Continued)

(52) U.S. Cl.
CPC ....... *H01M 10/052* (2013.01); *H01M 50/403* (2021.01); *H01M 50/414* (2021.01);
(Continued)

(58) Field of Classification Search
CPC .. H01M 50/411; H01M 50/414; H01M 50/42; H01M 50/417; H01M 50/461;
(Continued)

(56) References Cited

U.S. PATENT DOCUMENTS

| 2005/0175903 A1* | 8/2005 | Kim | ................... H01M 4/5815 |
| | | | 429/339 |
| 2013/0108899 A1 | 5/2013 | Schaefer | |

(Continued)

FOREIGN PATENT DOCUMENTS

| CN | 103682216 A | 3/2014 |
| CN | 104037380 A | 9/2014 |

(Continued)

OTHER PUBLICATIONS

International Search Report issued in PCT/KR2018/012571 (PCT/ISA/210), dated Jan. 24, 2019.
(Continued)

*Primary Examiner* — Jeremiah R Smith
(74) *Attorney, Agent, or Firm* — Birch, Stewart, Kolasch & Birch, LLP

(57) ABSTRACT

A separator for lithium-sulfur batteries and a lithium-sulfur battery including the same. The separator for lithium-sulfur batteries includes a separator substrate, a first coating layer formed on at least one surface of the separator substrate, and a second coating layer formed on the first coating layer. The first coating layer includes a polydopamine, and the second coating layer includes a lithium-substituted water-soluble polymer. Also a method for preparing the separator.

9 Claims, 5 Drawing Sheets

(51) Int. Cl.
*H01M 50/403* (2021.01)
*H01M 50/414* (2021.01)
*H01M 50/451* (2021.01)
*H01M 50/42* (2021.01)
*H01M 50/449* (2021.01)
*H01M 50/417* (2021.01)

(52) U.S. Cl.
CPC ......... *H01M 50/417* (2021.01); *H01M 50/42* (2021.01); *H01M 50/449* (2021.01); *H01M 50/451* (2021.01); *H01M 50/457* (2021.01)

(58) Field of Classification Search
CPC ............. H01M 50/449; H01M 50/457; H01M 50/403; H01M 50/451; H01M 10/0525
See application file for complete search history.

(56) References Cited

U.S. PATENT DOCUMENTS

| | | | |
|---|---|---|---|
| 2014/0242461 A1* | 8/2014 | Hwang | H01M 4/1395 252/500 |
| 2014/0272569 A1 | 9/2014 | Cai et al. | |
| 2015/0004475 A1* | 1/2015 | Jeon | H01M 10/0565 429/163 |
| 2015/0188109 A1 | 7/2015 | Kim et al. | |
| 2015/0318549 A1* | 11/2015 | Kishii | H01M 4/624 429/213 |
| 2016/0013463 A1* | 1/2016 | Roumi | H01M 10/052 429/145 |
| 2016/0049660 A1* | 2/2016 | Hwang | H01M 4/483 429/217 |
| 2016/0164060 A1 | 6/2016 | Zhang et al. | |
| 2016/0233475 A1* | 8/2016 | Son | H01M 10/0525 |
| 2017/0155151 A1* | 6/2017 | Bae | H01M 4/362 |
| 2017/0179468 A1 | 6/2017 | Fanous et al. | |
| 2018/0198156 A1 | 7/2018 | Lee et al. | |
| 2018/0226624 A1* | 8/2018 | Zhao | H01M 50/434 |
| 2019/0051939 A1* | 2/2019 | Huang | H01M 50/42 |
| 2019/0074516 A1* | 3/2019 | Oh | H01M 10/0525 |

FOREIGN PATENT DOCUMENTS

| | | | | |
|---|---|---|---|---|
| CN | 104051691 | * | 9/2014 | ........ H01M 10/0525 |
| CN | 104051691 | A | 9/2014 | |
| CN | 104051695 | A | 9/2014 | |
| CN | 104752661 | A | 7/2015 | |
| CN | 106784538 | A | 5/2017 | |
| JP | 2013-530488 | A | 7/2013 | |
| JP | 2018-532992 | A | 10/2016 | |
| JP | 2017-518625 | A | 7/2017 | |
| JP | 2018-520490 | A | 7/2018 | |
| KR | 10-2012-0121623 | A | 11/2012 | |
| KR | 10-2013-0012492 | A | 2/2013 | |
| KR | 10-2013-0127201 | A | 11/2013 | |
| KR | 10-2014-0073739 | A | 6/2014 | |
| KR | 10-2015-0078434 | A | 7/2015 | |
| KR | 10-2016-0054936 | A | 5/2016 | |
| KR | 10-2017-0090294 | A | 8/2017 | |
| KR | 10-2017-0091149 | A | 8/2017 | |

OTHER PUBLICATIONS

Zhang et al., "Poly(acrylic acid) gel as a polysulphide blocking layer for high performance lithium/sulphur battery", Journal of Materials Chemistry A, vol. 2, 2014, pp. 18288-18292.

Extended European Search Report, dated Oct. 22, 2020, for European Application No. 18869676.9.

* cited by examiner

[Figure 1]
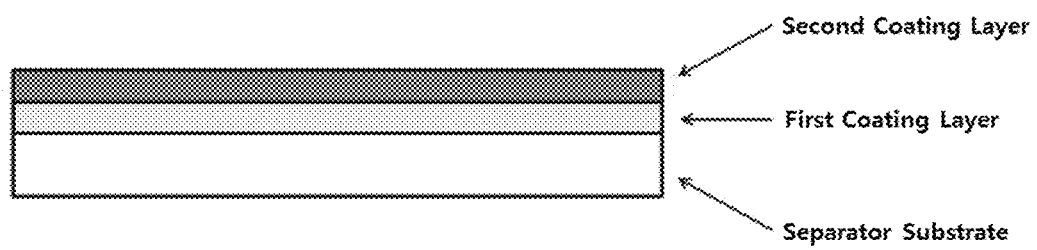
[Figure 2]
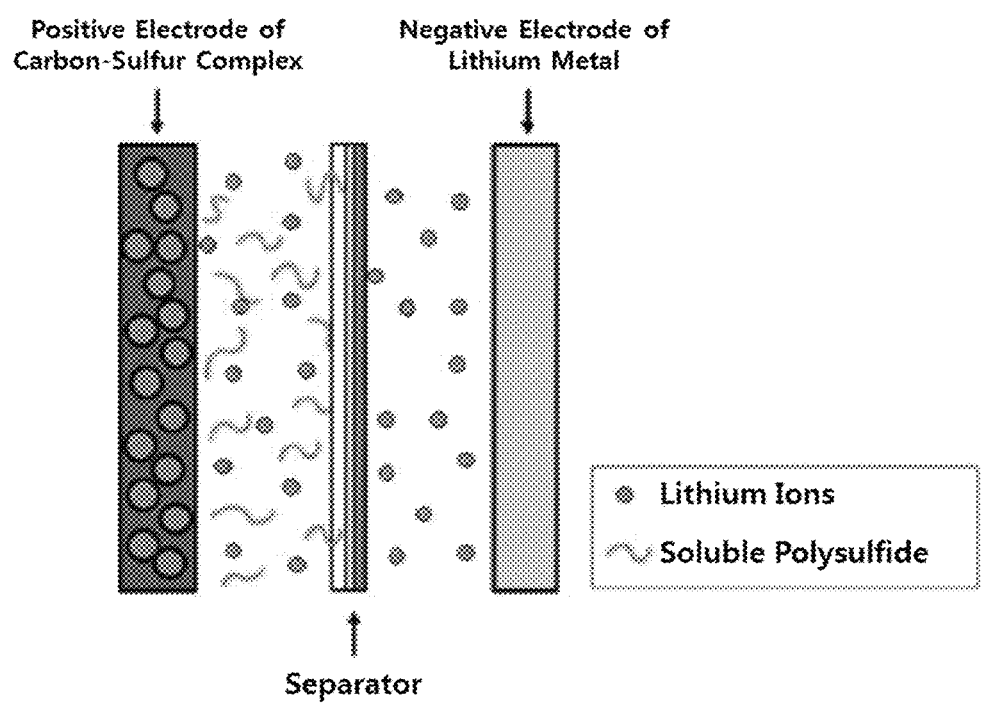

[Figure 3]
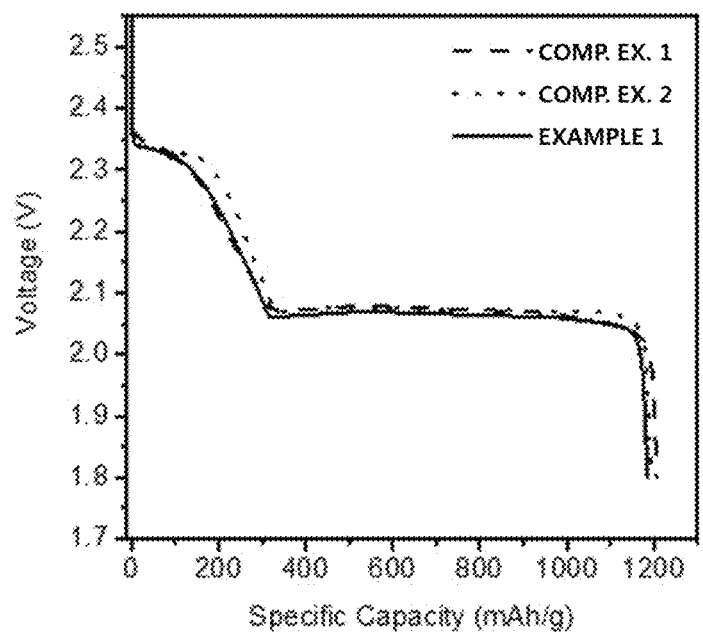
[Figure 4]
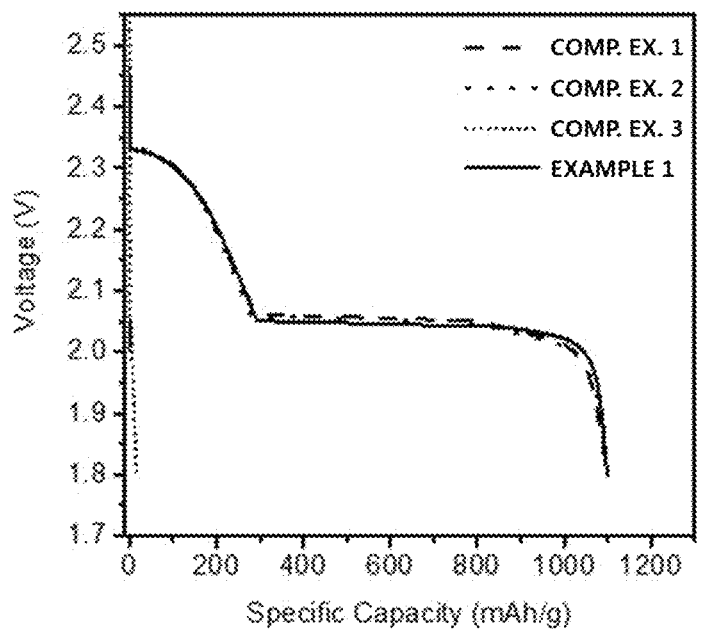

[Figure 5]
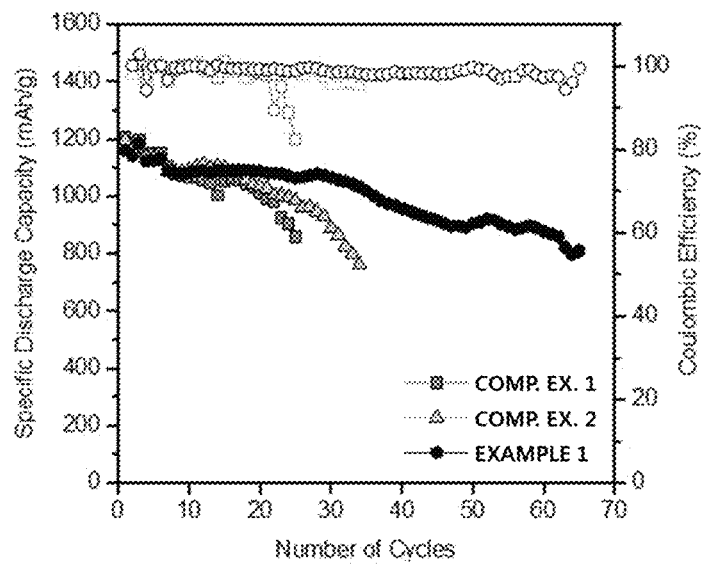
[Figure 6]
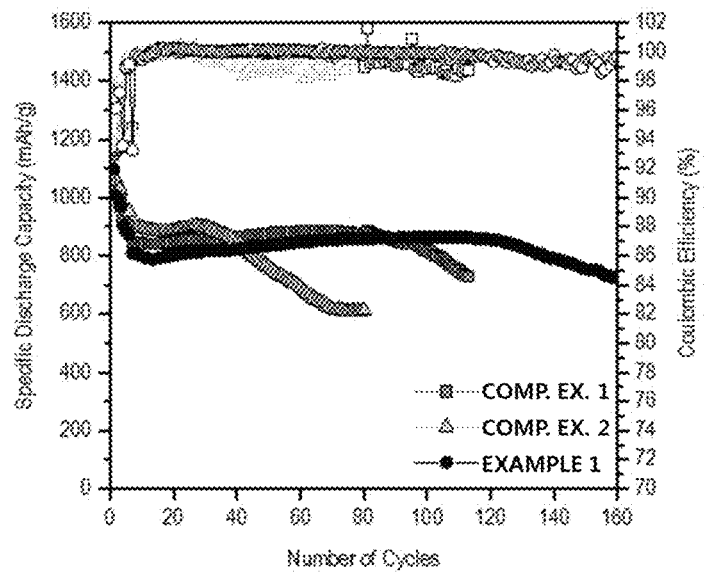

[Figure 7]
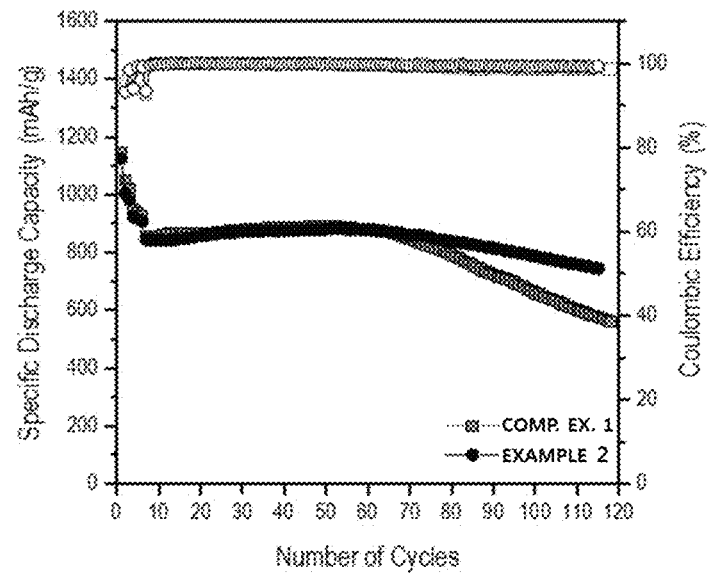
[Figure 8]
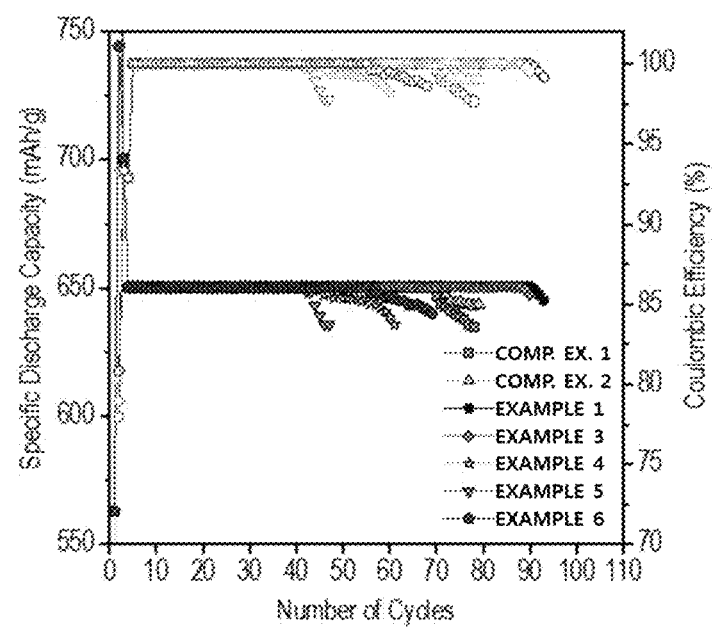

[Figure 9]
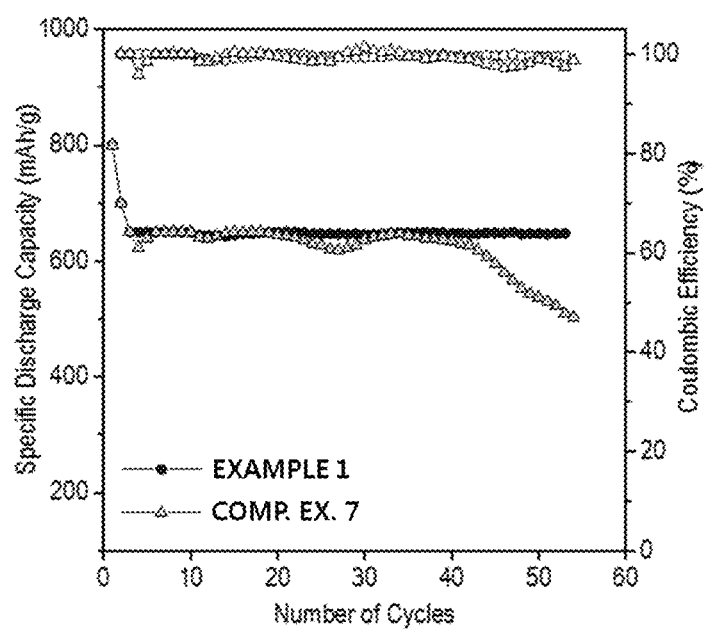

SEPARATOR FOR LITHIUM-SULFUR BATTERIES AND LITHIUM-SULFUR BATTERY COMPRISING THE SAME

TECHNICAL FIELD

This application claims priority to Korean Patent Application No. 10-2017-0138965 filed on Oct. 25, 2017 in the Korean Intellectual Property Office (KIPO), the entire contents of which are hereby incorporated by reference.

The present invention relates to a separator for lithium-sulfur batteries and a lithium-sulfur battery including the same. More particularly, the present invention relates to a separator for lithium-sulfur batteries, which includes a coating layer including a lithium-substituted water-soluble polymer, and a lithium-sulfur battery including the same.

BACKGROUND ART

In recent years, the trend towards small lightweight designs of electronic products, electronic devices, communication devices, and the like has advanced rapidly, and there is also an increasing demand for performance improvement of secondary batteries used as power sources for electric cars as a great need for these products has emerged due to the environmental issues. Among these, the lithium secondary batteries have come into the spotlight as high-performance batteries because they have a high energy density and a high standard electrode potential.

In particular, a lithium-sulfur (Li—S) battery is a secondary battery in which a sulfur-based material having a sulfur-sulfur bond (S—S bond) is used as a positive electrode active material and a lithium metal is used as a negative electrode active material. Sulfur that is a main material of the positive electrode active material has advantages in that it is very rich in resources, shows no toxicity, and has a low weight per atom. Also, because the lithium-sulfur battery has a theoretical discharge capacity of 1,675 mAh/g-sulfur and a theoretical energy density of 2,600 Wh/kg, the values of which are significantly higher than the theoretical energy densities (a Ni-MH battery: 450 Wh/kg, a Li—FeS battery: 480 Wh/kg, a Li—MnO$_2$ battery: 1,000 Wh/kg, and a Na—S battery: 800 Wh/kg) of other battery systems which are currently being studied, the lithium-sulfur battery is one of the most promising batteries which are currently being developed.

During the discharge response of the lithium-sulfur battery, an oxidation reaction of lithium occurs in a negative electrode, and a reduction reaction of sulfur occurs in a positive electrode. Before the discharge, sulfur has a cyclic $S_8$ structure. In this case, electric energy is generated using an oxidation-reduction reaction in which the oxidation number of S is reduced as an S—S bond is cleaved during the reduction reaction (discharging), and the oxidation number of S is increased as the S—S bond is re-formed during the oxidation reaction (charging). During this reaction, sulfur is converted into lithium polysulfides ($Li_2S_x$ where x=8, 6, 4, 2) having a linear structure by means of the reduction reaction in the cyclic $S_8$. Finally, lithium sulfide ($Li_2S$) is generated through completely reduction of such lithium polysulfides. In processes in which sulfur is reduced into the respective lithium polysulfides, a discharge behavior of the lithium-sulfur battery is characterized by showing a discharge voltage in a step-by-step manner unlike the lithium ion batteries.

In the lithium polysulfides such as $Li_2S_8$, $Li_2S_6$, $Li_2S_4$, $Li_2S_2$, and the like, the lithium polysulfides ($Li_2S_x$ wherein, typically, x>4) having a high oxidation number of sulfur are particularly easily soluble in a hydrophilic electrolyte solution. The lithium polysulfides soluble in the electrolyte solution are dispersed far from the positive electrode in which the lithium polysulfides are formed due to a difference in concentration. The lithium polysulfides eluted from the positive electrode in this way are lost out of a positive electrode reaction zone, thereby making the step-by-step reduction into lithium sulfide ($Li_2S$) impossible. That is, because the lithium polysulfides, which escape out of the positive electrode and the negative electrode and remain in a dissolved phase, cannot participate in a charge/discharge response of batteries, a decrease in amount of a sulfur material participating in an electrochemical reaction in the positive electrode may be caused, which mainly results in decreased charge capacity and lowered energy for the lithium-sulfur batteries.

Because a material such as polyethylene (PE) or polypropylene (PP) is generally used for a separator in the lithium-sulfur battery, a surface of the separator is hydrophobic due to the nature of the material. To improve the performance of the lithium-sulfur battery through an interaction with a water-soluble electrolyte, a method of introducing a water-soluble material into a separator has been discussed in the related art.

To introduce the water-soluble material into the hydrophobic separator, a method of coating a water-soluble material after increasing an viscosity of the water-soluble material, a method of using an organic solvent instead of the existing solvents, and the like have been used in the art. However, when such methods are used, they have problems in that the material is not dissolved by achieving the desired viscosity, or a coating solution permeates into pores of the separator due to the organic solvent, clogging the pores after drying.

Accordingly, there is a related-art demand for an improved method of introducing a water-soluble material into a separator. Also, there is a demand for a separator into which the water-soluble material is introduced by means of such a method.

DISCLOSURE

Technical Problem

To solve the above problems, an object of the present invention is to provide a separator for lithium-sulfur batteries capable of improving performance of lithium-sulfur batteries by introducing a polydopamine coating layer between a separator and a water-soluble coating layer and making use of a water-soluble coating layer including a lithium-substituted water-soluble polymer to improve an interaction between an electrolyte solution and the separator.

Technical Solution

According to a first aspect of the present invention, there is provided a separator for lithium-sulfur batteries, which includes:

a separator substrate;

a first coating layer formed on at least one surface of the separator substrate; and a second coating layer formed on the first coating layer.

According to one exemplary embodiment of the present invention, the first coating layer includes a polydopamine, and the second coating layer includes a lithium-substituted water-soluble polymer.

According to one exemplary embodiment of the present invention, the water-soluble polymer is formed through the polymerization of a monomer containing one or more carboxyl groups, and contains the carboxyl groups.

According to one exemplary embodiment of the present invention, the water-soluble polymer is a polyacrylic acid.

According to one exemplary embodiment of the present invention, at least 50% of hydrogen present in the carboxylic groups of the water-soluble polymer is substituted with lithium.

According to a second aspect of the present invention, there is provided a method of manufacturing a separator for lithium-sulfur batteries, which includes:

(1) mixing dopamine and a solvent to prepare a first composition;
(2) coating a separator substrate with the first composition to form a first coating layer;
(3) mixing a water-soluble polymer and a lithium precursor to prepare a second composition; and
(4) coating the first coating layer with the second composition to form a second coating layer, wherein in step (1), the dopamine in the solvent is self-polymerized to form a polydopamine.

According to one exemplary embodiment of the present invention, the lithium precursor in step (3) is added and mixed at 50 to 200 mol % based on the carboxyl groups of the water-soluble polymer.

According to a third aspect of the present invention, there is provided a lithium-sulfur battery including the aforementioned separator, a positive electrode, a negative electrode, and an electrolyte solution, wherein the separator is interposed between the positive electrode and the negative electrode.

Advantageous Effects

The separator for lithium-sulfur batteries according to the present invention can be applied to lithium-sulfur batteries, and thus has an advantage in that an interaction between an electrolyte solution and the separator can be improved to prevent in a decrease in charge capacity and a drop in energy for the lithium-sulfur batteries during repeated charge/discharge cycles.

DESCRIPTION OF DRAWINGS

FIG. 1 is a cross-sectional view of a separator for lithium-sulfur batteries according to an exemplary embodiment of the present invention.

FIG. 2 is a cross-sectional view of a lithium-sulfur battery according to an exemplary embodiment of the present invention.

FIG. 3 is a graph illustrating the initial specific capacities of lithium-sulfur batteries manufactured in Example 1 and Comparative Examples 1 and 2 of the present invention.

FIG. 4 is a graph illustrating the initial specific capacities of lithium-sulfur batteries manufactured in Example 1 and Comparative Examples 1 to 3 of the present invention.

FIG. 5 is a graph illustrating the lifespan characteristics of the lithium-sulfur batteries manufactured in Example 1 and Comparative Examples 1 and 2 of the present invention.

FIG. 6 is a graph illustrating the lifespan characteristics of the lithium-sulfur batteries manufactured in Example 1 and Comparative Examples 1 and 2 of the present invention.

FIG. 7 is a graph illustrating the lifespan characteristics of lithium-sulfur batteries manufactured in Example 2 and Comparative Example 1 of the present invention.

FIG. 8 is a graph illustrating the lifespan characteristics of lithium-sulfur batteries manufactured in Examples 1 and 3 and Comparative Examples 1, 2 and 4 to 6 of the present invention.

FIG. 9 is a graph illustrating the lifespan characteristics of the lithium-sulfur batteries manufactured in Example 1 and Comparative Example 7 of the present invention.

BEST MODE

Exemplary embodiments provided according to the present invention may all be embodied by means of the following description. Therefore, it should be understood that the following description is given only for the purpose of illustrating the preferred embodiments of the present invention, but is not intended to be limiting of the present invention.

Separator for Lithium-Sulfur Batteries

The present invention provides a separator for lithium-sulfur batteries, which includes a separator substrate, a first coating layer formed on at least one surface of the separator substrate, and a second coating layer formed on the first coating layer. The at least one surface of the separator substrate refers to one surface facing a positive electrode or a negative electrode, or both surfaces including the one surface and a surface opposite to the one surface. FIG. 1 is a cross-sectional view of a separator for lithium-sulfur batteries according to one exemplary embodiment of the present invention in which a first coating layer and a second coating layer are formed on one surface of a separator substrate.

The separator substrate is not particularly limited as long as it has an ability to penetrate electrolytes and ions and is typically used in the related art. However, as a porous, non-conductive or insulating material, the separator substrate, which has low resistance to migration of ions in an electrolyte solution and also has an excellent ability to hold moisture in the electrolyte solution, may be preferred. Particularly, a porous polymer film manufactured from a polyolefin-based polymer may be used alone or as a stack thereof. According to one exemplary embodiment of the present invention, polyethylene or polypropylene may be preferred as the polyolefin-based polymer.

The first coating layer is formed on at least one surface of the separator substrate, and includes a polydopamine.

Dopamine in the form of a monomer of the polydopamine is well-known as a neurotransmitter, and a molecule mimicking a 3,4-dihydroxy-lphenylalanine (L-DOPA) molecule found in the Mussels living in the sea. In particular, because polydopamines produced by oxidant-induced self-polymerizations and electrochemical polymerizations of dopamine have covalent catechol and imine functional groups, the polydopamines may form very strong bonds on solid surfaces such as electrodes or separators of batteries as well as organics such as a biomaterial, a synthetic polymer, and the like, thereby making it possible to perform surface reformation and surface modification and form self-assembled multilayers, nanocomposite thin films, and the like. The catechol functional group of dopamine is easily oxidized in the presence of oxygen, and self-polymerized to form polydopamine thin films having varying thicknesses.

Dopamine that is an environmentally friendly and easily available organic substance is self-polymerized in a buffer solution of approximately pH 8.5, and a polydopamine formed through this process is very highly reactive so that new bonds can be easily formed on surfaces of the polydopamine. Also, because the polydopamine can be self-polymerized at room temperature, the polydopamine has an advantage in that the coating may be possible without any additional reagents or equipment, resulting in reduced manufacturing costs and excellent process efficiency.

The polydopamine may be thinly and uniformly coated as a material having a high adhesion. A polydopamine coating layer may activate an electrode reaction and also prevent the diffusion of a lithium polysulfide because lithium ions are easily diffused in an electrolyte solution and the polydopamine coating layer does not permeate a lithium polysulfide as well. Also, because the polydopamine had strong adhesion to hydrophilic or water-soluble materials as well as the hydrophobic separator substrate, the hydrophobic separator substrate may be subjected to surface reformation.

In consideration of the functionalities of the aforementioned polydopamine, the first coating layer may be formed to a thickness of 0.1 to 100 µm, preferably 0.5 to 50 µm, and more preferably 1 to 10 µm. When a rang e of the thickness is less than the lower limit, effects on the diffusion of lithium ions and the adsorption of the lithium polysulfide, and an effect on the adhesion of the second coating layer including the water-soluble material may be poor. Also, when a range of the thickness is greater than the upper limit, problems regarding the electrode performance due to the poor diffusion of lithium ions may be caused, and the electrode may unnecessarily become thicker.

The second coating layer is formed on the first coating layer, and includes a lithium-substituted water-soluble polymer.

The water-soluble polymer may be easily separated without any strong adhesion due to different properties when the hydrophobic separator substrate is directly coated with the water-soluble polymer. A first coating layer including the polydopamine serves to compensate for these problems, and the water-soluble polymer may be strongly adhered onto the first coating layer. Because the separator substrate coated with the water-soluble polymer may be easily compatible with an electrolyte solution, the separator substrate may reduce resistance that may be caused by addition of the coating layer onto the separator. Also, because the water-soluble polymer has an effect of suppressing the polysulfide diffusion, the polysulfide generated in the positive electrode may be accumulated on a surface of the negative electrode to prevent a problem of eluding sulfur. The water-soluble polymer is not particularly limited as long as it is coated onto the separator substrate to have the aforementioned functionality. According to one exemplary embodiment of the present invention, the water-soluble polymer is formed through polymerization of a monomer containing one or more carboxyl groups (—COOH), and contains the carboxyl groups. The monomer is mainly polymerized via multiple bonds other than carboxyl groups. Therefore, the water-soluble polymer may contain a number of carboxyl groups in the polymer, depending on a degree of polymerization thereof. The carboxyl groups contained in the water-soluble polymer may be substituted with lithium. According to one exemplary embodiment of the present invention, a polyacrylic acid may be preferred as the water-soluble polymer.

The water-soluble polymer may have a structure in which the carboxyl groups are substituted with lithium. When the separator substrate is directly coated with the water-soluble polymer, an effect of suppressing the diffusion of the lithium polysulfide may be expected as described above, but water-soluble polymer films are compactly formed, which makes it difficult to pass lithium ions therethrough. When lithium is substituted in the water-soluble polymer, the separator substrate may reduce resistance that may be caused due to the aforementioned problems. Lithium may be substituted with hydrogen in the water-soluble polymer. In this case, because hydrogen contained in an acidic functional group is easily detached from a polymer, it may be easily substituted with lithium. Carboxylic acid may be preferred as the acidic functional group. According to one exemplary embodiment of the present invention, the water-soluble polymer may have at least 50%, preferably at least 70%, of hydrogen substituted with lithium with respect to the carboxyl groups. When less than 50% of hydrogen is substituted with lithium with respect to the carboxyl groups of the water-soluble polymer, the lithium ions may be readily transported through the second coating layer, resulting in increased resistance by the separator.

In consideration of the functionalities of the aforementioned lithium-substituted water-soluble polymer, the second coating layer may be formed to a thickness of 0.1 to 100 µm, preferably 0.5 to 50 µm, and more preferably 1 to 10 µm. When a range of the thickness is less than the lower limit, an effect of suppressing the diffusion of the lithium polysulfide in the separator may be poor. On the other hand, when a range of the thickness is greater than the upper limit, conductivity of the lithium ions in the separator may be significantly reduced.

Method of Manufacturing a Separator for Lithium-Sulfur Batteries

The aforementioned separator is manufactured by a method which includes (1) mixing dopamine and a solvent to prepare a first composition, (2) coating a separator substrate with the first composition to form a first coating layer, (3) mixing a water-soluble polymer and a lithium precursor to prepare a second composition, and (4) coating the first coating layer with the second composition to form a second coating layer. In step (1), the dopamine in the solvent is self-polymerized to form a polydopamine. Here, the composition is used to have the most comprehensive meaning as a material consisting of one or more components. Hereinafter, the method of manufacturing a separator for lithium-sulfur batteries will be described in detail.

First, dopamine and a solvent are mixed to prepare a first composition. The solvent may uniformly disperse dopamine, and thus a material that may be easily evaporated to dryness may be used as the solvent. The dopamine dissolved in the solvent may be self-polymerized so that the dopamine can be converted into a polydopamine. In this case, because the polydopamine formed through the self-polymerization is very highly reactive and form new bonds on a surface thereof, the polydopamine has excellent adhesion. An additional binder is not required during the polydopamine coating due to the adhesion of such a polydopamine itself. According to one exemplary embodiment of the present invention, acetonitrile, methanol, ethanol, tetrahydrofuran, water or isopropyl alcohol may be used as the solvent. More particularly, water may be preferred as the solvent. The water may be used in the form of a buffer solution. In this case, an oxidant such as $NaIO_4$, piperidine, or the like may be used to enhance a formation rage of the polydopamine coating layer. According to one exemplary embodiment of the present invention, a concentration of the polydopamine in the first composition may be preferably in a range of 1 to 100 mM. Also, the mixing to prepare the first composition may be performed by a conventional method using a conventional mixing machine, for example a paste mixer, high-shear mixer, homo-mixer, and the like.

The separator substrate is coated with the first composition prepared by the aforementioned method to form a first coating layer. A wet coating method is used as a method of coating the first composition, but the present invention is not particularly limited thereto. According to one exemplary embodiment of the present invention, the method may be a method such as doctor blade coating, dip coating, gravure coating, slit die coating, spin coating, comma coating, bar coating, reverse roll coating, screen coating, or cap coating. More particularly, dip coating may be preferred as the method. To remove the solvent after coating, a drying process may be performed. In the drying process, the drying temperature and time may vary depending on the solvents used. Particularly, the drying process may be preferably performed within 24 hours in a vacuum oven at 60 to 80° C. to prevent deformation of the separator and the coating layer.

Next, a water-soluble polymer and a lithium precursor are mixed to prepare a second composition. The mixing is preferably performed in an aqueous solution state, and a compound having high solubility in water is preferred as the lithium precursor to facilitate substitution of lithium in the water-soluble polymer. When the solubility of the lithium precursor is not significant, a concentration of lithium in the solution may be very low. For this purpose, a method of substituting some of dissolved lithium ions, drying the lithium ions and re-dissolving the lithium ions to substitute the lithium ions may be used. When the lithium may be substituted in the water-soluble polymer, the temperature conditions are not particularly limited, but it is desirable to perform the mixing under temperature conditions in which the solution is heated to a temperature greater than or equal to room temperature in consideration of the efficiency of lithium substitution. According to one exemplary embodiment of the present invention, the mixing may be performed at a condition of a temperature of 50 to 80° C. Here, the water-soluble polymer is as described above, and the lithium precursor is not particularly limited as long as it is an inorganic compound containing lithium atoms, which lithium ions thereof can substitute hydrogen in the water-soluble polymer. According to one exemplary embodiment of the present invention, the inorganic compound may be $Li_2O$, $Li_2O_2$, LiOH, LiCl, LiBr, LiI, $LiClO_4$, $Li_2SO_4$, $LiNO_3$, or a combination thereof. Amounts of the water-soluble polymer and the lithium precursor to be mixed may be properly adjusted within a range capable of substituting more than 50 mol % of the water-soluble polymer with lithium with respect to the carboxyl groups, as described above. According to one exemplary embodiment of the present invention, the lithium precursor may be introduced and mixed at 50 to 200 mol %, preferably 50 to 100 mol % with respect to the carboxyl groups of the water-soluble polymer. When the lithium precursor is introduced at 100 mol % or more, almost all hydrogen ions present in the carboxyl groups of the water-soluble polymer may be substituted with lithium. As a result, the remaining lithium precursor may be present in a crystal from on the second coating layer. However, when an amount of the lithium precursor is greater than 200 mol %, the performance of the battery may be rather degraded.

The first coating layer is coated with the resulting second composition to form a second coating layer. The coating of the second composition may be performed in the same manner as in the aforementioned method of coating the first composition. Like the first coating layer, a drying process may be performed in a process of forming the second coating layer. In the drying process, the drying temperature and time may vary depending on the water-soluble polymers used. Particularly, the drying process may be preferably performed within 24 hours in a vacuum oven at 60 to 80° C. to prevent deformation of the separator and coating layer.

The coating layer may be formed on one or both surfaces of the separator substrate.

Lithium-Sulfur Battery

The aforementioned separator for lithium-sulfur batteries is applied to a lithium-sulfur battery. The lithium-sulfur battery includes the separator, a positive electrode, a negative electrode, and an electrolyte solution, and the separator is interposed between the positive electrode and the negative electrode. When a first coating layer and a second coating layer is formed on one surface of a separator substrate in the case of the separator, the separator is configured so that the second coating layer is interposed between the positive electrode and the negative electrode to face the negative electrode. FIG. 2 is a cross-sectional view of a lithium-sulfur battery in which the first coating layer and the second coating layer are formed only on one surface of the separator substrate. Hereinafter, respective configurations of the lithium-sulfur battery other than the aforementioned separator will be described in detail.

The positive electrode includes elemental sulfur ($S_8$), a sulfur-based compound or a mixture thereof as a positive electrode active material. The sulfur-based compound may be particularly $Li_2S_n$ (n≥1), an organic sulfur compound, or a carbon-sulfur polymer $((C_2S_x)_n$ where x=2.5 to 50, and n≥2).

Because a sulfur material used as the positive electrode active material has no electrical conductivity when used alone, the sulfur material is blended with a conductive material and applied. The conductive material may be porous. Therefore, conductive materials may be used as the conductive material without limitation as long as they can have porosity and conductivity. For example, a carbon-based material having the porosity may be used. Carbon black, graphite, graphene, activated charcoal, carbon fibers, carbon nanotubes (CNT), and the like may be used as the carbon-based material. Also, metallic fibers such as metal meshes, and the like; metallic powders such as copper, silver, nickel, aluminum, and the like; or organic conductive materials such as polyphenylene derivatives, and the like may also be used. The conductive materials may be used alone or in a combination thereof.

In the negative electrode, a material capable of reversibly intercalating or deintercalating lithium ions (Li), a material capable of reacting with lithium ions to reversibly form a lithium-containing compound, a lithium metal, or a lithium alloy may be used as the negative electrode active material. For example, the material capable of reversibly intercalating or deintercalating lithium ions (Li) may be crystalline carbon, amorphous carbon, or a mixture thereof. The material capable of reacting with lithium ions (Li) to reversibly form a lithium-containing compound may, for example, be tin oxide, titanium nitrate, or silicone. The lithium alloy may, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), silicon (Si), and tin (Sn).

In a process of charging/discharging the lithium-sulfur battery, sulfur used as the positive electrode active material may be converted into an inactive material, which may then be attached to a surface of a lithium negative electrode. As such, inactive sulfur refers to sulfur which can no longer participate in an electrochemical reaction of the positive electrode because it is subjected to various electrochemical or chemical reactions, and the inactive sulfur formed on the surface of the lithium negative electrode has an advantage in that it serves as a protective layer of the lithium negative electrode.

The electrolyte solution includes a lithium salt and a non-aqueous organic solvent. The lithium salt of the present invention is a material that is easily dissolved in the non-aqueous organic solvent, and may, for example, include one or more selected from the group consisting of LiCl, LiBr, LiI, LiClO$_4$, LiBF$_4$, LiB$_{10}$Cl$_{10}$, LiB(Ph)$_4$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiNO$_3$, LiFSI, chloroborane lithium, lower aliphatic lithium carbonate, lithium tetraphenylborate, and imide.

A concentration of the lithium salt may be in a 0.2 to 4 M, particularly 0.3 to 2 M, and more particularly 0.3 to 1.5 M, depending on various factors such as an exact composition of the electrolyte mixture, the solubility of the salt, the conductivity of a salt to be dissolved, the charge/discharge conditions of a battery, the working temperature, and other factors known in the field of lithium batteries. When the lithium salt is used at a concentration of less than 0.2 M, the performance of an electrolyte may be degraded due to a drop in conductivity of the electrolyte. On the other hand, when the lithium salt is used at a concentration of greater than 4 M, mobility of lithium ions (Li) may be reduced due to an increase in viscosity of the electrolyte.

The non-aqueous organic solvent should serve to dissolve the lithium salt sufficiently. For example, aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxy ethane, 1,2-diethoxy ethane, tetrahydroxy franc, 2-methyl tetrahydrofuran, dimethylsulfoxide, 1,3-dioxolane, 4-methyl-1,3-dioxene, diethyl ether, formamide, dimethyl formamide, dioxolane, acetonitrile, nitromethane, methyl formate, methyl acetate, phosphite triester, trimethoxy methane, dioxolane derivatives, sulforane, methylsulforane, 1,3-dimethyl-2-imidazolidinone, propylene carbonate derivatives, tetrahydrofuran derivatives, ethers, methyl propionate, ethyl propionate, and the like may be used as the non-aqueous organic solvent of the present invention. In this case, the organic solvent may be one organic solvent or a mixture of two or more organic solvents.

An organic solid electrolyte or an inorganic solid electrolyte may be used instead of the electrolyte solution. For example, polyethylene derivatives, polyethylene oxide derivatives, polypropylene oxide derivatives, phosphate ester polymers, polyagitation lysine, polyester sulfide, polyvinyl alcohols, polyvinylidene fluoride, and polymers containing ionic dissociation groups may be used as the organic solid electrolyte. Also, nitrides, halides, sulfate, and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$, and the like may, for example, be used as the inorganic solid electrolyte.

To improve the charge/discharge characteristics, flame retardancy, and the like, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may also be added to the electrolyte solution of the present invention. When necessary, the electrolyte solution may further include a halogen-containing solvent such as carbon tetrachloride, ethylene trifluoride, or the like in order to impart incombustibility. Also, the electrolyte solution may further include a carbon dioxide gas, and may also further include fluoroethylene carbonate (FEC), propene sultone (PRS), fluoropropylene carbonate (FPC), and the like in order to improve high-temperature storage characteristics.

A stack-type electrode assembly may be manufactured by interposing a separator between a positive electrode plate and a negative electrode plate and stacking the separator. Here, the positive electrode plate and the negative electrode plate are prepared by cutting the aforementioned positive electrode and negative electrode to predetermined sizes, respectively, and the separator is cut to a predetermined size corresponding to those of the positive electrode plate and the negative electrode plate. Alternatively, a stack- and folding-type electrode assembly may be manufactured by arranging two or more positive electrode plates and negative electrode plates on a separator sheet, or arranging two or more unit cells, which are stacked with separators interposed between the two or more positive electrode plates and negative electrode plates, on a separator sheet so that a positive electrode and negative electrode face each other with separator sheets interposed therebetween, and winding the separator sheet, or bending the separator sheet to a size corresponding to a size of an electrode plate or a unit cell.

A battery pack including the aforementioned lithium-sulfur battery may be used as a power source for electric vehicles (EVs), hybrid electric vehicles (HEVs), plug-in hybrid electric vehicles (PHEVs), power storage systems, and the like.

MODE FOR INVENTION

Hereinafter, preferred examples are given to aid in understanding the present invention. However, it should be understood that the following examples are given only for the purpose of understanding the present invention more easily, but is not intended to be limiting of the present invention.

EXAMPLES

Example 1

1. Formation of First Coating Layer

Dopamine (dopamine hydrochloride commercially available from Sigma-Aldrich) was dissolved in a basic buffer solution (pH 8.5) to prepare a polydopamine solution (a first composition) at a concentration of approximately 10 mM. A polyethylene film having a thickness of approximately 20 μm was dipped in the polydopamine solution thus prepared, and then dried at approximately 60° C. to form a first coating layer having a thickness of approximately 1 μm on the polyethylene film.

2. Formation of Second Coating Layer

An aqueous solution including approximately 1% by weight of polyacrylic acid was prepared, and LiOH was dissolved in the aqueous solution of polyacrylic acid so that COOH of the polyacrylic acid and lithium were present in a molar ratio of 1:1, thereby preparing a solution for forming a second coating layer (a second composition). The aforementioned second composition was prepared at a condition of a temperature of approximately 70° C., and then cooled to room temperature after the second composition was prepared. The solution was applied onto a polyethylene film having the first coating layer prepared by the aforementioned method using a Mayer bar, and then dried at approximately 60° C. to form a second coating layer having a thickness of approximately 1 μm on the first coating layer. A degree of lithium substitution was measured by means of pH. The results of determination showed that almost all of the added lithium substituted hydrogen present in COOH of the polyacrylic acid.

3. Manufacture of Lithium-Sulfur Battery

A positive electrode, a negative electrode, and an electrolyte solution were prepared as follows, and assembled with the separator prepared by the aforementioned method to manufacture a lithium-sulfur battery.

(1) Positive Electrode

A positive electrode mixture having a composition including 85% by weight of a positive electrode active material, which was prepared by mixing sulfur and carbon nanotubes (CNTs) at a weight ratio of 7:3, 5% by weight of carbon nanofibers as a conductive material, and 10% by weight of a binder, was added to D.I water to prepare a positive electrode slurry, and an aluminum current collector was coated with the positive electrode slurry to manufacture a positive electrode.

(2) Negative Electrode

Lithium foil having a thickness of approximately 35 μm was used as the negative electrode.

(3) Electrolyte Solution

An electrolyte solution prepared by adding 0.4 M LiFSI and 4% by weight of $LiNO_3$ to an ether-based solvent was used as the electrolyte solution. To check the performance of the batteries more exactly, experiments were dividedly performed on an electrolyte solution having high cathodic reactivity and an electrolyte solution having high anodic stability with varying compositions of the solvent in the following experimental examples. The batteries showed high capacity in the electrolyte solution having high cathodic reactivity, but had short lifespan characteristics. On the other hand, the battery capacity was maintained at a low level in the electrolyte solution having high anodic stability, but the batteries had long lifespan characteristics.

Example 2

A lithium-sulfur battery was manufactured in the same manner as in Example 1, except that, upon formation of the second coating layer, LiOH was dissolved in an aqueous solution including 1% by weight of polyacrylic acid so that COOH of the polyacrylic acid and lithium were present in a molar ratio of 1:0.5, thereby preparing a solution for forming a second coating layer.

Example 3

A lithium-sulfur battery was manufactured in the same manner as in Example 1, except that, upon formation of the second coating layer, LiOH was dissolved in an aqueous solution including 1% by weight of polyacrylic acid so that COOH of the polyacrylic acid and lithium were present in a molar ratio of 1:2, thereby preparing a solution for forming a second coating layer.

Comparative Example 1

A lithium-sulfur battery was manufactured in the same manner as in Example 1, except that a polyethylene film having a thickness of approximately 20 μm was used as the separator without forming a first coating layer and a second coating layer.

Comparative Example 2

A lithium-sulfur battery was manufactured in the same manner as in Example 1, except that a separator in which only a first coating layer was formed on a polyethylene film having a thickness of approximately 20 μm was used without forming a second coating layer.

Comparative Example 3

A lithium-sulfur battery was manufactured in the same manner as in Example 1, except that a second coating layer was formed using an aqueous solution including 1% by weight of polyacrylic acid without mixing LiOH upon formation of the second coating layer.

Comparative Example 4

A lithium-sulfur battery was manufactured in the same manner as in Example 1, except that, upon formation of the second coating layer, LiOH was dissolved in an aqueous solution including 1% by weight of polyacrylic acid so that COOH of the polyacrylic acid and lithium were present in a molar ratio of 1:3, thereby preparing a solution for forming a second coating layer.

Comparative Example 5

A lithium-sulfur battery was manufactured in the same manner as in Example 1, except that, upon formation of the second coating layer, LiOH was dissolved in an aqueous solution including 1% by weight of polyacrylic acid so that COOH of the polyacrylic acid and lithium were present in a molar ratio of 1:4, thereby preparing a solution for forming a second coating layer.

Comparative Example 6

A lithium-sulfur battery was manufactured in the same manner as in Example 1, except that, upon formation of the second coating layer, LiOH was dissolved in an aqueous solution including 1% by weight of polyacrylic acid so that COOH of the polyacrylic acid and lithium were present in a molar ratio of 1:5, thereby preparing a solution for forming a second coating layer.

Comparative Example 7

A lithium-sulfur battery was manufactured in the same manner as in Example 1, except that heparin was used instead of the polyacrylic acid upon formation of the second coating layer.

Experimental Example 1: Evaluation of First Discharge Characteristics

1. Comparison Evaluation of Lithium-Sulfur Batteries Manufactured in Example 1 and Comparative Examples 1 and 2 (Using an Electrolyte Solution Having High Cathodic Reactivity)

A profile of potentials and specific capacities measured by discharging the respective lithium-sulfur batteries manufactured in Example 1 and Comparative Examples 1 and 2 at 0.1 C is shown in FIG. 3. Referring to FIG. 3, it can be seen that there was no overvoltage in Comparative Example 1 in which the first coating layer and the second coating layer were not coated, as well as Comparative Example 2 in which only the first coating layer was coated and Examples in which the first coating layer and the second coating layer (a lithium-substituted polyacrylic acid) were coated together.

2. Comparison Evaluation of Lithium-Sulfur Batteries Manufactured in Example 1 and Comparative Examples 1 to 3 (Using an Electrolyte Solution Having High Anodic Stability)

A profile of potentials and specific capacities measured by discharging the respective lithium-sulfur batteries prepared in Example 1 and Comparative Examples 1 to 3 at 0.1 C is shown in FIG. 4. Referring to FIG. 4, it can be seen that cells were not driven due to high resistance of the coating layer in the case of Comparative Example 3 in which the polyacrylic acid not substituted with lithium was used as the second coating layer.

Experimental Example 2: Evaluation of Lifespan Characteristics

1. Comparison Evaluation of Lithium-Sulfur Batteries Manufactured in Example 1 and Comparative Examples 1 and 2 (Using an Electrolyte Solution Having High Cathodic Reactivity)

Each of the lithium-sulfur batteries manufactured in Example 1 and Comparative Examples 1 and 2 was changed/discharged for 2.5 cycles at 0.1 C/0.1 C (changing/discharging) and 3 cycles at 0.2 C/0.2 C (changing/discharging), and then repeatedly changed/discharged for cycles at 0.3 C/0.3 C (changing/discharging) to measure discharge capacity and Coulombic efficiency of each of the batteries per cycle. The results are shown in FIG. 5. Referring to FIG. 5, it can be seen that Comparative Example 2 in which only the first coating layer was formed showed lifespan characteristics similar to Comparative Example 1 in which the first coating layer and the second coating layer were not coated, but that Example 1 including all the first coating layer and the second coating layer had remarkably improved lifespan characteristics, compared to Comparative Examples 1 and 2.

2. Comparison Evaluation of Lithium-Sulfur Batteries Manufactured in Example 1 and Comparative Examples 1 and 2 (Using an Electrolyte Solution Having High Anodic Stability)

Each of the lithium-sulfur batteries manufactured in Example 1 and Comparative Examples 1 and 2 was changed/discharged for 2.5 cycles at 0.1 C/0.1 C (changing/discharging) and 3 cycles at 0.2 C/0.2 C (changing/discharging), and then repeatedly changed/discharged for cycles at 0.3 C/0.5 C (changing/discharging) to measure discharge capacity and Coulombic efficiency of each of the batteries per cycle. The results are shown in FIG. 6. Referring to FIG. 6, unlike the results of FIG. 5, it can be seen that Comparative Example 2 in which only the first coating layer was formed showed lifespan characteristics significantly lower than Comparative Example 1 in which the first coating layer and the second coating layer were not coated, but that Example 1 including all the first coating layer and the second coating layer still had remarkably improved lifespan characteristics, compared to Comparative Examples 1 and 2.

3. Comparison Evaluation of Lithium-Sulfur Batteries Manufactured in Example 2 and Comparative Example 1 (Using an Electrolyte Solution Having High Anodic Stability)

Each of the lithium-sulfur batteries manufactured in Example 2 and Comparative Example 1 was changed/discharged for 2.5 cycles at 0.1 C/0.1 C (changing/discharging) and 3 cycles at 0.2 C/0.2 C (changing/discharging), and then repeatedly changed/discharged for cycles at 0.3 C/0.5 C (changing/discharging) to measure discharge capacity and Coulombic efficiency of each of the batteries per cycle. The results are shown in FIG. 7. Referring to FIG. 7, it can be seen that Example 2 in which a second coating layer coated with the polyacrylic acid with which approximately 50% of lithium ions were substituted was used as the second coating layer had improved lifespan characteristics, compared to Comparative Example 1 in which the first coating layer and the second coating layer were not coated.

4. Comparison Evaluation of Lithium-Sulfur Batteries Manufactured in Examples 1 and 3 and Comparative Examples 1, 2 and 4 to 6 (Using an Electrolyte Solution Having High Anodic Stability)

Each of the lithium-sulfur batteries manufactured in Examples 1 and 3 and Comparative Examples 1, 2 and 4 to 6 was changed/discharged for 2.5 cycles at 0.1 C/0.1 C (changing/discharging), and then repeatedly changed/discharged for cycles at 0.3 C/0.3 C (changing/discharging) to measure discharge capacity and Coulombic efficiency of each of the batteries per cycle. The result values calculated by limiting the measured capacities to 650 mAh/g are shown in FIG. 8. Referring to FIG. 8, it can be seen that the lifespan characteristics of the batteries were rather degraded when the lithium precursor was introduced at a 3-fold molar ratio with respect to the COOH of the polyacrylic acid (Comparative Examples 4 to 6).

5. Comparison Evaluation of Lithium-Sulfur Batteries Manufactured in Example 2 and Comparative Example 7 (Using an Electrolyte Solution Having High Anodic Stability)

Each of the lithium-sulfur batteries manufactured in Example 1 and Comparative Example 7 was changed/discharged for 2.5 cycles at 0.1 C/0.1 C (changing/discharging), and then repeatedly changed/discharged for cycles at 0.3 C/0.5 C (changing/discharging) to measure discharge capacity and Coulombic efficiency of each of the batteries per cycle. The result values calculated by limiting the measured capacities to 650 mAh/g are shown in FIG. 9. Referring to FIG. 9, it can be seen that the lifespan characteristics of the applied batteries were remarkably improved when the second coating layer including the polyacrylic acid was formed on the first coating layer of the polydopamine (Example 1), compared to when the heparin-containing second coating layer was formed (Comparative Example 7).

All simple changes and modifications made to the present invention fall within the scope of the present invention, and the specific scope of protection of the present invention will be apparent from the appended claims.

The invention claimed is:
1. A separator for lithium-sulfur batteries comprising:
a separator substrate;
a first coating layer on at least one surface of the separator substrate, said first coating layer comprising a polydopamine; and
a second coating layer on the first coating layer, said second coating layer comprising a lithium-substituted water-soluble polymer,
wherein the water-soluble polymer is formed through polymerization of a monomer containing one or more carboxyl groups, and the water-soluble polymer contains the carboxyl groups,
wherein at least 50% of hydrogen present in the carboxylic groups of the water-soluble polymer is substituted with lithium,
wherein the second coating layer is prepared by adding a lithium precursor to the water-soluble polymer in an amount of 50 to 200 mol % based on the carboxyl groups of the water-soluble polymer, and mixing the lithium precursor and the water-soluble polymer, wherein the first coating layer has a thickness of 0.1 μm to 100 μm,
the second coating layer has a thickness of 0.1 μm to 100 μm, and
the separator substrate is a polyethylene film or a polypropylene film.

2. The separator for lithium-sulfur batteries according to claim 1, wherein the water-soluble polymer is a polyacrylic acid.

3. The separator for lithium-sulfur batteries according to claim 1, wherein at least 70% of hydrogen present in the carboxylic groups of the water-soluble polymer is substituted with lithium.

4. A method of manufacturing the separator for lithium-sulfur batteries defined in claim 1, comprising:
   (1) mixing dopamine and a solvent to prepare a first composition;
   (2) coating a separator substrate with the first composition to form a first coating layer;
   (3) mixing a water-soluble polymer and a lithium precursor to prepare a second composition; and
   (4) coating the first coating layer with the second composition to form a second coating layer,
   wherein in step (1), the dopamine in the solvent self-polymerizes to form a polydopamine.

5. The method according to claim 4, wherein the water-soluble polymer in step (3) is formed through polymerization of a monomer containing one or more carboxyl groups, and the water-soluble polymer contains the carboxyl groups.

6. The method according to claim 4, wherein the lithium precursor in step (3) is an inorganic compound containing lithium atom.

7. The method according to claim 4, wherein the lithium precursor in step (3) is added and mixed at 50 mol % to 200 mol % based on the carboxyl groups of the water-soluble polymer.

8. A lithium-sulfur battery comprising:
   the separator defined in claim 1;
   a positive electrode;
   a negative electrode; and
   an electrolyte solution,
   wherein the separator is interposed between the positive electrode and the negative electrode.

9. The lithium-sulfur battery according to claim 8, wherein in the separator, the first coating layer and the second coating layer are formed on one surface of the separator substrate, and the separator is interposed between the positive electrode and the negative electrode so that the second coating layer faces the negative electrode.

* * * * *